May 3, 1966 T. H. BLADEN 3,249,855

AUTOMATIC SIGNAL SEARCHING MEANS FOR MAINTAINING A RADIO-FREQUENCY OSCILLATOR AT A PREDETERMINED FREQUENCY

Filed Dec. 14, 1962

INVENTOR.
THOMAS H. BLADEN

BY [signature]

ATTORNEY.

3,249,855

AUTOMATIC SIGNAL SEARCHING MEANS FOR MAINTAINING A RADIO-FREQUENCY OSCILLATOR AT A PREDETERMINED FREQUENCY

Thomas H. Bladen, Adelphi, Md., assignor to the United States of America as represented by the Secretary of the Navy

Filed Dec. 14, 1962, Ser. No. 244,840
6 Claims. (Cl. 324—.5)

Figures 1, 2:
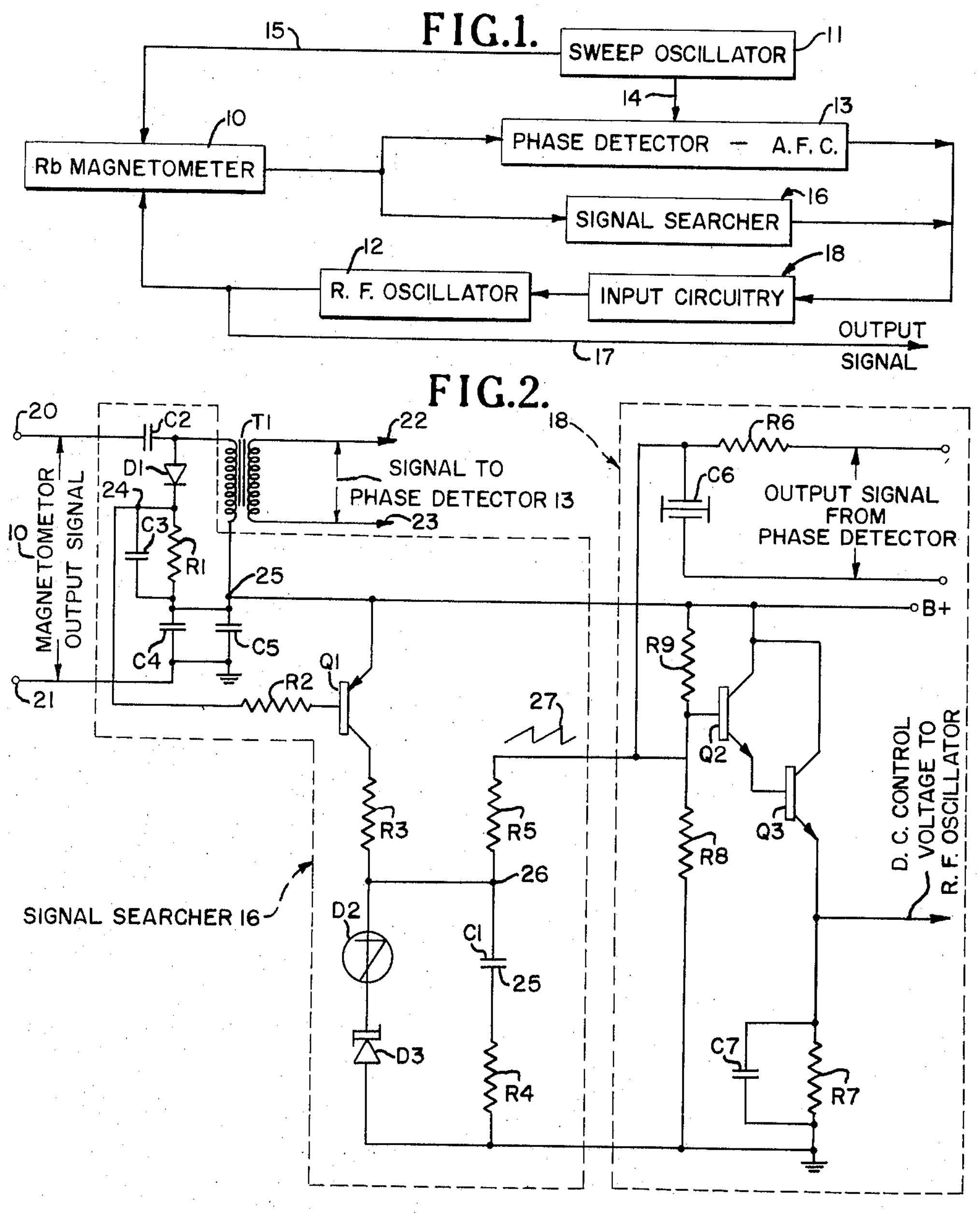

The invention described herein may be manufactured and used by or for the Government of the United States of America for governmental purposes without the payment of any royalties thereon or therefor.

The present invention relates to magnetic field detection and registering apparatus and, more particularly, to the attendant circuitry of such apparatus wherein automatic operation at a remote, unattended location is obtained.

In the field of magnetometers, it has been the general practice to employ rubidium or helium vapor cells for the detection of magnetic fields. A radio frequency oscillator is adjusted to that frequency at which the cell experiences the resonant condition of optical pumping. Although such devices have served the purpose, they have not proved entirely satisfactory where it is necessary to locate a magnetometer at some remote, unattended position, such as in underwater mines, and the like. In such locations, manual adjustment of the radio-frequency oscillator to a frequency corresponding to the magnetic background field of the earth is not possible. The problem of delimitating and maintaining the radio-frequency oscillations at a frequency corresponding to the magnetic background field frequency is accomplished by automatic signal searching means in the present invention, thereby precluding the manual adjustment necessary in prior art devices.

The general purpose of this invention is to provide an unattended magnetometer which embraces all of the advantages of similarly employed magnetic field detection devices and possesses none of the aforedescribed disadvantages. To attain this, the present invention contemplates a new and improved semiconductor signal searching circuit whereby automatic sweeping of the R.F. oscillator to locate the resonant frequency is accomplished. Upon locating the resonant frequency, the signal searcher automatically switches off to enable the normal lock-in operation of the automatic frequency control circuitry.

An object of the present invention is the provision of a signal searching circuit which automatically sweeps the R.F. oscillator to locate the resonant frequency of a vapor cell in a magnetometer.

Another object is to provide a magnetometer to be operated automatically in an unattended remote location.

A further object of the invention is the provision of a signal searching circuit which automatically switches off when a predetermined signal output level from the magnetometer is reached.

Still another object is to provide a signal searching circuit which is immune to spurious signals, such as magnetometer output signals harmonically related to the resonant frequency and generated from an impurity of the rubidium cell.

A still further object is to provide a semiconductor signal searcher which utilizes a PNPN diode having control characteristics for temperature compensation superior to conventional two-layer diodes or transistors.

Other objects and features of the invention will become apparent to those skilled in the art as the disclosure is made in the following description of an illustrative embodiment of the invention, as shown in the accompanying sheet of drawing in which:

FIG. 1 is a block diagram illustration of a preferred embodiment of the invention; and FIG. 2 is a circuit diagram of the signal searching circuit of the present invention.

Referring now to the drawing, wherein like reference characters designate like or corresponding parts throughout the several views, there is shown in FIG. 1 a magnetometer system suitable for remote, unattended operation. The rubidium magnetometer 10 is supplied with oscillations from the sweep oscillator 11 and the radio-frequency oscillator 12. The sweep oscillator 11 provides a sweeping signal which sweeps the magnetometer through the background magnetic field of the earth. Such background field sweeping is necessary to provide an alternating current output to phase detector-A.F.C. circuit 13. Sweep oscillator 11 also produces a reference signal which is supplied to the phase detector and automatic frequency control circuit 13. This signal enables the phase detector-A.F.C. circuit 13 to adjust the R.F. oscillator 12 by controlling the amount of D.C. bias voltage supplied to it. The signals from the sweep oscillator 11 can be fed by way of insulated conductors or cables 14 and 15 to the phase detector-A.F.C. circuit 13 and magnetometer 10, respectively. Thus, the reference voltage supplied to the phase detector 13 via the conductor 14 is used to adjust the A.F.C. circuit which in turn controls the R.F. oscillator 12 to the extent necessary in order to provide the proper resonant frequency to the rubidium cell of magnetometer 10. The resonant signal searcher 16, hereinafter referred to as signal searcher 16, which will be described in more detail with reference to FIG. 2, provides a second input to the R.F. oscillator 12. The phase detector-A.F.C. circuit 13 takes the other of its inputs from the output of magnetometer 10. Signal searcher 16 has an input signal which is also derived from the output of magnetometer 10.

In order to operate the rubidium magnetometer within a given magnetic background field, it is necessary to apply an R.F. field of the correct frequency to the rubidium cell in order that the optical pumping condition of resonance be obtained. In prior art magnetometer systems this R.F. field, corresponding to the resonant condition of optical pumping, was determined by manually adjusting the R.F. oscillator so as to provide a field within $\pm 20$ milligauss of the background magnetic field. At this point the A.F.C. circuitry would proceed to lock-in the R.F. oscillator and maintain it at the frequency corresponding to the resonant condition. A particular disadvantage of the prior art operation is that remote, unattended operation of the magnetometer is not possible.

The signal searcher 16 permits the use of magnetometer systems at remote, unattended locations by providing automatic adjustment of the R. F. oscillator 12 in a manner to be hereinafter described. Since the magnetometer 10 produces an output only during resonance, the phase detector 13 is ineffective initially to bring the R.F. oscillator 12 within the frequency range necessary to provide a field corresponding to the magnetic background field of the earth. The signal searcher 16 is utilized to sense this no-output condition from magnetometer 10 and when such a condition exists, sweeps the R.F. oscillator 12 above and below the present free running frequency. When the R.F. oscillator 12 traverses the frequency which provides the magnetic field corresponding to the resonance condition of the magnetometer 10, the magnetometer provides an output which switches the signal searcher 16 off and switches the phase detector-A.F.C. circuit on, thereby enabling the lock-in operation of R.F. oscillator 12. The change in the output signal of R.F. oscillator 12 is indicative of the change in magnetic field intensity when this locked-in condition exists and may be supplied as an output 17 from the magnetometer system to a recording device or the like.

Considering next FIG. 2, there is shown the detailed circuitry of the signal searcher 16 wherein the output signal from the magnetometer 10 is used to provide the desired input to R.F. oscillator 12. The output signal from magnetometer 10 appears at the input terminals 20, 21 of the signal searcher 16 and is coupled to the anode of diode D1 and primary of transformer T1 by coupling capacitor C2. The secondary of transformer T1 is connected to the input terminals 22, 23 of phase detector-A.F.C. circuit 13. The primary of transformer T1 is connected to ground through the capacitor C5, while the cathode of diode D1 is connected to ground by the parallel combination of capacitor C3, resistor R1 and series capacitor C4. A source of positive potential, B+, is applied to junction 25 formed by the connection of the primary winding of transformer T1, resistor R1, capacitors C3, C4, and C5. Junction 24, formed by the connection of the cathode of diode D1, resistor R1 and capacitor C3, provides the source of D.C. control voltage which is supplied to the base electrode of PNP transistor Q1 through resistor R2. Transistor Q1 is shown connected in common emitter fashion with the emitter electrode connected to the B+ potential and the collector electrode connected to one side of the load resistor R3. The other side of resistor R3 is connected to the PNPN diode D2 and the capacitor C1. The diode D2 is a four-layer diode such as Shockley Diode 4D20–3 and exhibits a control characteristic superior to Zener diodes or transistors where ambient temperature changes must be taken into account. Temperature changes do not substantially affect the avalanche-multiplication conduction of the diode. Diode D2 is connected to ground by the Zener diode D3 while capacitor C1 is connected to ground potential by the limiting resistor R4. Resistor R5, which couples the output of the signal searcher 16 to the input circuitry of the R.F. oscillator 12, is connected to junction 26 formed by the connection of resistor R3, diode D2, and capacitor C1.

Dashed line 18 represents the input circuitry for the R.F. oscillator 12, wherein the impedance matching for the oscillator is provided by the two emitter follower transistors Q2 and Q3 connected in a cascaded arrangement. Resistor R5 couples the output of the signal searcher 16 to the base electrode of transistor Q2, while the filter capacitor C6 and resistor R6 couple the output signal from the phase detector 13 to the base electrode of transistor Q2. Resistors R8 and R9 are biasing resistors. The emitter electrode of transistor Q2 is connected to the base of transistor Q3 and the collectors of both transistors Q2 and Q3 are connected to the source of B+ potential. The emitter output of transistor Q3 provides the D.C. control voltage to the R.F. oscillator 12 and is connected to ground by load resistor R7 and by-pass condenser C7.

In the operation of the signal searcher 16, half-wave rectification of the magnetometer output signal is provided by the diode D1. In the absence of an output signal from the magnetometer 10, there will be no rectification and the D.C. control voltage appearing at junction 24 will be insufficient to reverse bias the base-emitter junction of transistor Q1; thus, the transistor Q1 will be maintained in its conducting state. Conduction of transistor Q1 causes capacitor C1 to charge through resistor R3 in an exponential manner. As capacitor C1 charges, the potential at junction 26 will rise and eventually reach the breakdown level of the PNPN diode D2. Diode D2 will now conduct via carrier avalanche multiplication thereby discharging capacitor C1. Capacitor C1 will discharge until the discharging current is insufficient to sustain conduction of the four-layer diode D2. Then diode D2 cuts off and another cycle of operation is initiated as capacitor C1 begins to charge again. Zener diode D3 operates to locate the center of the peak-to-peak sawtooth sweep signal 27 at a predetermined level above and below the no-signal voltage of the transistor Q2. Resistor R5 limits the sweep signal and also provides isolation between the phase detector and signal searcher circuits. The impedance matching circuit provided by transistors Q2 and Q3 presents a high impedance to the phase detector (-A.F.C. circuit 13) and a low impedance to the R.F. oscillator 12.

An output signal will be produced by the magnetometer 10 when the magnetic field corresponding to the resonant frequency of the rubidium cell is supplied to it as set forth heretofore. This output signal is rectified by diode D1 and provides a positive D.C. voltage at junction 24 to cut off the transistor Q1. Rendering transistor Q1 nonconductive shuts off the charging current to capacitor C1 thereby discontinuing the sawtooth-sweep signal 27. When the output signal is produced by the magnetometer 10, it not only operates to control the signal searcher 16 and discontinue the sawtooth-sweep output 27, but it is applied to the phase detector-A.F.C. circuit 13 which is energized to maintain the R.F. oscillator at the resonant frequency.

The parameters of the components of the signal searcher 16 are chosen so that, notwithstanding various harmonically related output signals from the magnetometer, the transistor Q2 is prevented from being switched to its nonconducting state. In the case of a rubidium magnetometer wherein natural rubidium is used, two isotopes of Rb exist in differing concentration; Rb85–75%, Rb87–25%. Since the resonant frequency of these isotopes differ, 433kc. and 699kc. respectively at 1 gauss, the output of the magnetometer will comprise two signal amplitudes. The higher level output is derived with Rb85 while the spurious, lower level output is derived from Rb87. The spurious, lower level output signal, although harmonically related to the desired output signal produced when resonant optical pumping occurs, will be insufficient to provide the required D.C. control voltage to render the transistor Q1 nonconductive. Even though these spurious signals are supplied to the phase detector-A.F.C. circuit 13, the signal searcher 16 will continue to produce the sweep output 27 because of the high threshold level needed to bias transistor Q1 nonconducting. Thus lock-in by the A.F.C. circuit occurs only when the resonant frequency signal provides a magnetic field corresponding to the true condition of optical pumping. Furthermore, the signal searcher 16 cannot be inadvertently turned on, because as long as the magnetometer 10 is being supplied with a frequency within the resonant frequency range, it in turn provides an output which maintains the signal searcher 16 in its nonconducting state.

Thus, it may be seen that the signal searcher sweeps the R.F. oscillator output over a frequency range above and below the present free-running frequency until the resonant frequency corresponding to the magnetic background field and therefore condition of optical pumping is located. A D.C. control voltage output signal then automatically disconnects the signal searcher circuit to allow normal phase detector-automatic frequency control of the R.F. oscillator. The signal searcher circuit thus allows automatic lock-in operation of the magnetometer when measurements are to be performed in an unattended, remote location.

The operation of the magnetometer system may be summarized as follows: the chassis housing magnetometer 10, phase detector-A.F.C. circuitry 13, signal searcher 16, input circuitry 18, and R.F. oscillator 12 is positioned at some remote, unattended location, such as in a harbor, where the magnetic intensity is to be detected and used to trigger some device such as a mine or registering means. Shore cables (not shown) are laid from a D.C. power source on shore to the equipment which is submerged at some predetermined position in the harbor. When the power supply is turned on, power is supplied via the shore cable to the various devices. At this instant no output signal is present at the magnetometer, so the signal searcher 16 which is biased conducting initiates the sweeping of variable R.F. oscillator 12 via the output circuitry 18. The R.F. oscillator is continually swept until such time that the radio frequency field supplied to the rubidium, helium, or other nuclear resonant cell of the magnetometer 10 is sufficient to supplement the ambient magnetic field, thereby resulting in the optical pumping of the cell. This optical pumping of the cell produces an output signal from the magnetometer which causes the signal searcher to switch off, thereby discontinuing the sweeping of R.F. oscillator 12. In addition to switching off signal searcher 16, the output signal triggers the phase detector-A.F.C. circuit 13 which now takes over the controlling function of R.F. oscillator 12. The A.F.C. circuit locks-in the R.F. oscillator until the phase detector senses a change in the ambient magnetic field.

Ambient magnetic field changes during the aforedescribed locked-in operation are sensed by the phase detector and compensated for by the A.F.C. circuit and R.F. oscillator in the following manner. A change in the ambient magnetic field will be superimposed on the constant, locked-in R.F. generated magnetic field, and the resulting magnetic field will not be the one which produces optimum pumping. Therefore, it is necessary to change the constant R.F. generated magnetic field so as to return the magnetometer to its optimum pumping condition.

The change in the R.F. oscillations necessary to obtain this condition will be indicative of the charge of intensity in the ambient magnetic field.

To effect this change in the R.F. magnetic field, the magnetometer output is again utilized. The output of magnetometer 10 will be at a maximum when the sweep oscillator 11 sweeps the background field through the condition of optimum optical pumping. The phase detector senses the frequency of sweep oscillator 11 via cable 14 when this condtion exists and varies the A.F.C. circuit accordingly so that R.F. oscillator 12 will provide a compensating field which will maintain the optimum optical pumping condition. A change in the R.F. oscillator output 17 to provide this compensation will necessarily be proportional to the change in the ambient magnetic field intensity and can be used to detonate a mine or record such changes.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. Apparatus for providing indications of remote magnetic field intensity comprising:
- a magnetic field responsive means for providing an output signal when supplied with a radio frequency field,
- a variable radio frequency magnetic field source connected to supply said magnetic field responsive means with a radio frequency magnetic field; and
- a resonant signal searching means connected to the output of said magnetic field responsive device, and to the input of said radio frequency magnetic field source for selectively sweeping said variable radio frequency source in the absence of an output signal from said magnetic field responsive means, and discontinuing said sweeping when an output signal is present.

2. Apparatus according to claim 1 wherein said resonant signal searching means comprises:
- a semiconductor sweep generator which provides a sawtooth voltage to said input of said magnetic field source.

3. Apparatus according to claim 2 wherein the magnetic field responsive means comprises:
- a rubidium vapor magnetometer.

4. Apparatus according to claim 3 wherein said semiconductor sweep generator comprises:

- a half-wave rectifier connected to said magnetic field responsive means for rectifying said output signal,
- a transistor connected to the output of said rectifier, and rendered nonconductive upon the rectification of said output signal,
- a capacitor connected in series with said transistor and charged by the current therethrough, and
- a PNPN type diode connected in parallel with said capacitor, for discharging said capacitor when a predetermined voltage level is developed across said capacitor.

5. Magnetometric apparatus for providing indications of magnetic field intensity comprising:
- a magnetometer for providing an output signal when supplied with a radio frequency magnetic field,
- a variable radio frequency magnetic field source connected to supply said magnetometer with a radio frequency magnetic field,
- a resonant signal searching means connected to the output of said magnetometer and to the input of said radio frequency magnetic field source for automatically sweeping said radio frequency magnetic field source in the absence of the output signal,
- a phase detector connected to the output of said magnetometer for energizing an automatic frequency control circuit when the output signal is present at said magnetometer,
- an automatic frequency control circuit connected to the output of said phase detector and to the input of said variable radio frequency magnetic field source for locking-in said radio frequency magnetic field source when energized by said phase detector; and
- a sweeping oscillator for providing an input signal to said magnetometer and said phase detector for providing automatic compensation of said radio frequency magnetic field source when said magnetometer is subjected to ambient magnetic field changes.

6. Apparatus according to claim 5 wherein said resonant signal searching means comprises:
- a transistor having a base electrode, a collector electrode and an emitter electrode,
- a source of D.C. control voltage connected to said base electrode, for controlling the conduction of said transistor,
- a capacitor connected to said collector electrode for charging by said transistor,
- a power supply source connected to said emitter electrode, providing a source of current to be controlled by said transistor,
- a PNPN diode connected in parallel with said capacitor for discharging said capacitor when a predetermined voltage is developed across said capacitor, and
- a Zener diode connected in series with said PNPN diode for controlling the conduction of said PNPN diode.

References Cited by the Examiner

UNITED STATES PATENTS 3,174,099 3/1965 Larson .............. 324—.5

FOREIGN PATENTS 885,459 12/1961 Great Britain.

OTHER REFERENCES

Parsons, L. W., and Wiatr, Z. M., Rubidium Vapor Magnetometer. In Journal of Scientific Instruments, vol. 39, No. 6, pp. 292–299, June 1962.

WALTER L. CARLSON, *Primary Examiner.*

FREDERICK M. STRADER, *Examiner.*

R. J. CORCORAN, *Assistant Examiner.*